United States Patent
Weiss

[19]

[11] Patent Number: 5,855,462
[45] Date of Patent: Jan. 5, 1999

[54] CONE BOLT-CONNECTION FOR MULTI-DISC SHAFT CLUTCHES HAVING FIRST AND SECOND CLAMPING SLEEVES

[76] Inventor: Rudolf Weiss, Händelstr. 14, D-48691 Vreden, Germany

[21] Appl. No.: 872,799

[22] Filed: Jun. 10, 1997

[30] Foreign Application Priority Data

Jun. 25, 1996 [DE] Germany ................. 196 25 318.7

[51] Int. Cl.⁶ ................................................ F16B 35/02
[52] U.S. Cl. ......................................... 411/383; 411/55
[58] Field of Search ........................ 411/55, 60, 541, 411/383–385, 426

[56] References Cited

U.S. PATENT DOCUMENTS

| | | | |
|---|---|---|---|
| 1,194,792 | 8/1916 | Stewart | 411/383 |
| 3,271,058 | 9/1966 | Anderson | 411/383 |
| 4,048,898 | 9/1977 | Salter | 411/55 |
| 4,435,100 | 3/1984 | Cox | 411/383 |
| 4,743,138 | 5/1988 | Goy | 411/55 |
| 5,577,854 | 11/1996 | Jacob | 411/546 |

FOREIGN PATENT DOCUMENTS 913840 6/1954 Germany ................. 411/374

*Primary Examiner*—Flemming Saether
*Attorney, Agent, or Firm*—Proskauer Rose LLP

[57] ABSTRACT

The invention relates to a cone bolt-connection for multi-disc shaft clutches, comprising a clamping bolt (8) and a clamping sleeve (10), whereby the seat between the clamping sleeve and the clamping bolt is conically shaped. The bolt connection according to the invention provides a defined tightening measure and a particularly high centring accuracy. It is characterized in that its clamping sleeve (10) carries a second clamping sleeve (11) which has a collar (18) and, in conjunction with a clamping ring (12), positively fixes the disc packet (6, 7) in axial direction, whereby the seat between the two clamping sleeves (10, 11) is cylindrically shaped, and in that the clamping bolt (8) and the first clamping sleeve (10) form an annular gap (S) whose width is proportional to the tightening measure.

5 Claims, 2 Drawing Sheets

CONE BOLT-CONNECTION FOR MULTI-DISC SHAFT CLUTCHES HAVING FIRST AND SECOND CLAMPING SLEEVES

FIELD OF THE INVENTION

The present invention relates to a cone bolt-connection for multi-disc shaft clutches, comprising a clamping bolt and a clamping sleeve, whereby the seat between the clamping sleeve and the clamping bolt is conically shaped.

BACKGROUND OF THE INVENTION

From DE 34 43 485 C2, a flexible all-steel shaft clutch is known which comprises a connecting flange for each of the two clutch halves and a spring-elastic disc-packet ring located between, and axially distant from, the two connecting flanges. This spring-elastic disc-packet is alternately connected to a clamping bolt in circumferential direction by way of one or the other connecting flange. The disc-packet ring is seated on clamping sleeves of the clamping bolts and is clamped between clamping rings, together with the connecting flange. The seat between the clamping sleeves and the respective clamping bolts is shaped conically, whereby the axial dimensions of the disc-packet ring, the clamping rings as well as the conical seats are mutually coordinated in such a way that, as a result of the axial clamping force of the clamping bolt, the disc-packet ring subjected to initial axial clamping force at the fixing points, is subjected to additional initial radial clamping force in its seat, because the clamping sleeves—due to the conical seat—have been opened out during initial clamping. This shaft clutch has been well proven in practical use.

It is the object of the present invention to provide a cone bolt-connection which can be installed in existing multi-disc shaft clutches with cylindrical boreholes in the disc packet and the connecting flange, instead of a traditional cylindrical close-tolerance bolt connection, and which allows fast and simple control of the set tightening measure.

SUMMARY OF THE INVENTION

This task is achieved by a cone bolt-connection of the type mentioned in the introduction, in which the clamping sleeve carries a second clamping sleeve which has a collar and, in conjunction with a clamping ring, positively fixes the disc packet in axial direction, whereby the seat between the two clamping sleeves is cylindrically shaped, and in which the clamping bolt and the first clamping sleeve form an annular gap whose width is proportional to the tightening measure of the cone bolt-connection.

Because of the second clamping sleeve, the cone bolt-connection according to the invention allows more exact centering of a disc packet than is the case with the cone bolt-connection of the all-steel shaft clutch known from DE 34 43 485 C2. The annular gap formed by the clamping bolt and the reduction sleeve enables exact, defined tightening of the bolt connection. In this way, the tightening measure can be quickly and clearly controlled. It is furthermore advantageous if the disc packet at the second clamping sleeve is provided with positive initial clamping with the clamping ring. This largely eliminates micro movement of the discs.

A further advantage arises due to a significant reduction of the tightening moment, thus avoiding high support forces at the flanges.

In an advantageous embodiment of the cone bolt-connection according to the invention, the clamping sleeve, at one end, comprises a collar, and at the opposite end an exterior thread with a nut axially clamping the disc packet, while the clamping bolt, at one end comprises a head and at the opposite end a threaded borehole with a bolt, by means of which the clamping sleeve can be opened out radially.

This embodiment distinguishes itself in that the axial fixing and the radial centering of the disc packet can be undertaken separately. In this way optimal rigidity of the bolt point can be achieved while compensating for all manufacturing tolerances.

Further preferred embodiments of the invention are characterized in the dependent claims.

BRIEF DESCRIPTION OF THE DRAWINGS

Below, the invention is illustrated in more detail by means of several exemplary embodiments and with reference to the accompanying drawing, as follows.

Figure 1:
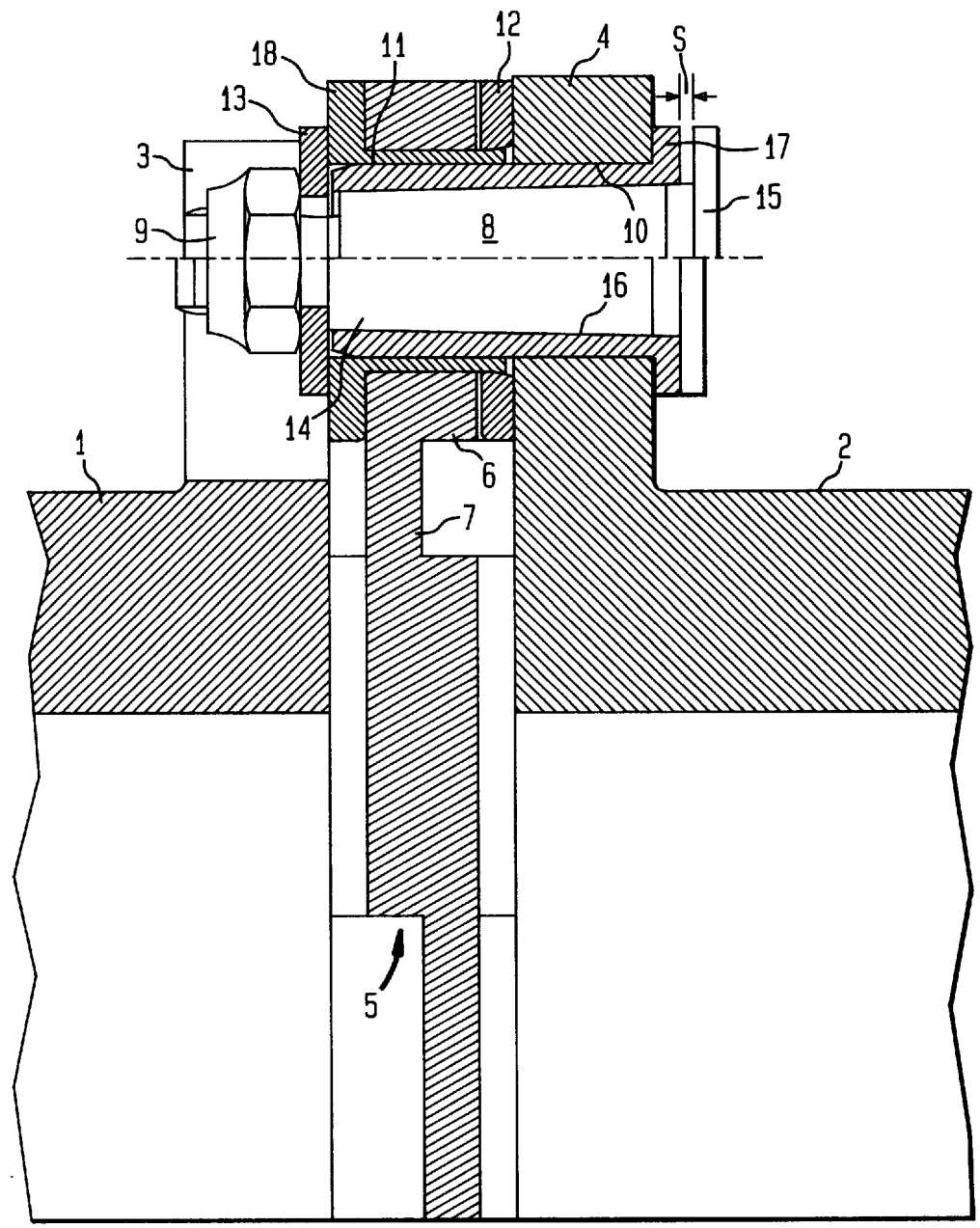
FIG. 1 is a lateral view of the upper half of an all-steel shaft clutch, shown in longitudinal section and laterally cut off, with a cone bolt-connection according to the invention whereby above the longitudinal axis of the bolt connection, the position of the clamping bolt prior to tightening, and below this longitudinal axis the position of the clamping bolt after tightening, is shown.

The all-steel shaft clutch shown in FIG. 1 connects two clutch parts 1, 2, comprising connecting flanges 3, 4. Between the two connecting flanges 3, 4, at some axial distance, there is a spring-elastic disc-packet ring 5, made up of individual disc packets 6, 7. The disc-packet ring 5 is alternately attached to the one or the other flange 3, 4.

DETAILED DESCRIPTION OF THE PREFERRED EMBODIMENTS

The cone bolt-connection comprises a clamping bolt 8, a bolt nut 9, a first clamping sleeve 10, a second clamping sleeve 11, a clamping ring 12 and a spacer 13. The clamping bolt 8 comprises a conical shaft 14 and a cylindrical head 15. The clamping sleeve 10 has a conical borehole 16 and is seated on the conical shaft 14 of the clamping bolt 8. On the outside, the clamping sleeve 10 has a cylindrical case area. Furthermore, it is provided with a cylindrical collar 17 facing the cylindrical bolt head 15 and, prior to tightening, forming an annular gap with it.

The second clamping sleeve 11, located at the opposite end, comprises a cylindrical borehole, so that it is axially movable on the clamping sleeve 10. On the outside, the second clamping sleeve 11 also has a cylindrical case area. Furthermore it comprises a cylindrical collar 18 which, in conjunction with the clamping ring 12, provides positive initial clamping in axial direction for the two disc packets. To this effect, the clamping ring 12 comprises a conical borehole with which the end of the clamping sleeve 11 opposite the collar 18 interacts in its opened-out state. As can be seen from the drawing, the clamping ring 12 directly rests against the connecting flange 4 of the clutch part 2, whereas the clamping sleeve 11 terminates with play in front of the connecting flange 4.

By tightening the bolt nut 9 which is supported at the collar 18 of the second clamping sleeve 11 by way of spacer 13, further axial clamping of the disc packets 6, 7 and radial opening out of the two clamping sleeves 10, 11 is caused. In this way the cylindrical seat both in the flange bore and in the disc-packet bore is radially centred, whereby tolerances due to the manufacturing process are completely compensated for by elastic deformation. The maximum tightening measure is defined by the annular gap S between bolt head 15 and clamping sleeve head 17. The true tightening measure can be controlled by means of the gap width.

Figure 2:
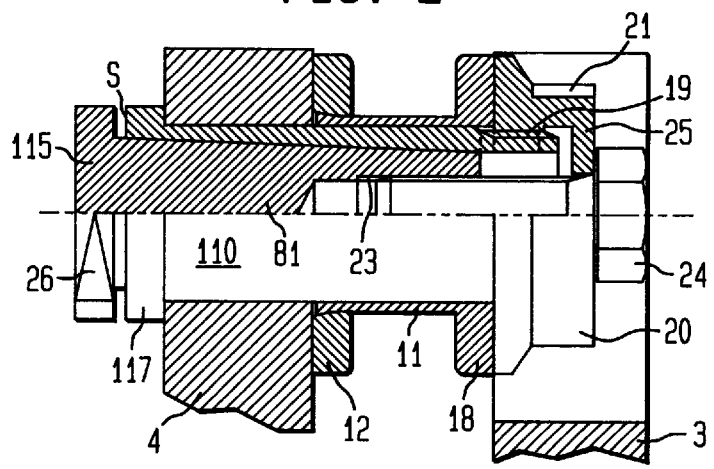
FIG. 2 shows a longitudinal section of a second embodiment of a cone bolt-connection according to the invention.
Figure 3:
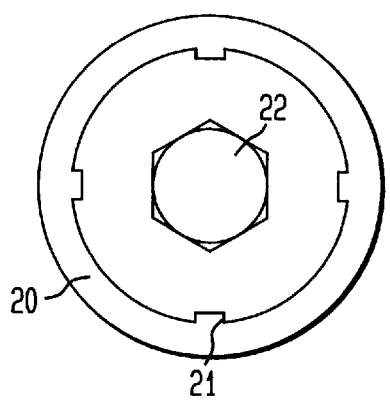
FIG. 3 is a frontal view of the clamping bolt head of the cone bolt-connection according to FIG. 2.
Figure 4:
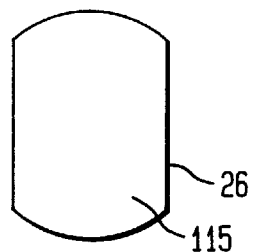
FIG. 4 is a frontal view of the end of the cone bolt-connection, according to FIG. 2, located at the opposite end of the clamping bolt head.

The embodiment shown in FIGS. 2 to 4 differs from the embodiment shown in FIG. 1 in particular by the clamping sleeve 110 seated on the clamping bolt 81 comprising an exterior thread 19 at the extremity located opposite the collar 117; with a nut 20—on the outside—comprising diametrically opposed channels 21, being threaded onto the said exterior thread 19. By means of this nut, the disc packet (not shown), provided with initial clamping by the second clamping sleeve 11 and the clamping ring 12, can be axially clamped independently of the clamping bolt 81.

Furthermore, in contrast to the embodiment according to FIG. 1 where a bolt nut is used, the clamping bolt 81 is pulled into the clamping sleeve 110 by means of a bolt 22, Accordingly, the clamping bolt 81 comprises a threaded borehole 23, into which the bolt 22 is screwed. In this, the head 24 of the bolt 22 is supported at nut 20 which comprises a shoulder 25 by way of a stay. In order to hold the clamping bolt 81 during screwing-in of the bolt 22, the bolt head 115 comprises two parallel flattened areas 26.

Figure 5:
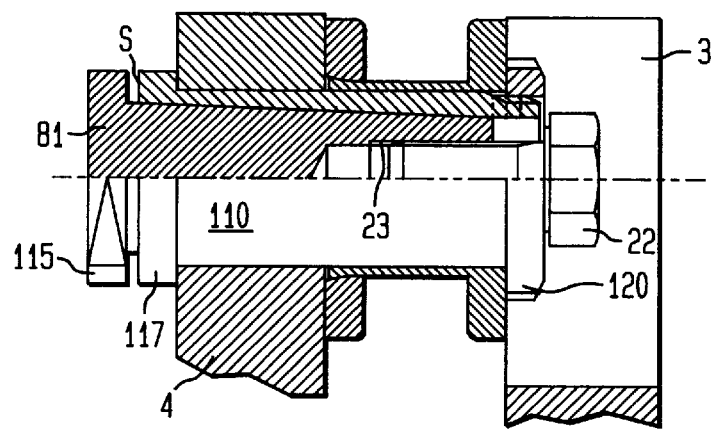
FIG. 5 shows a longitudinal section of a third embodiment.

FIG. 5 shows a third embodiment. This varies from the modification according to FIG. 2 merely in that the nut 120 in this case has no shoulder, and the head of the bolt 22 is supported directly at the front of the clamping sleeve 110.

List of Drawing References

1 Coupling part
2 Further coupling part
3 Connecting flange
4 Connecting flange
5 Disc-packet ring
6 Disc packet
7 Disc packet
8 Clamping bolt
9 Bolt nut
10 First clamping sleeve
11 Second clamping sleeve
12 Clamping ring
13 Spacer
14 Conical bolt shaft
15 Bolt head
16 Conical borehole
17 Collar
18 Collar
19 Exterior thread
20 Nut
21 Channels
22 Bolt
23 Threaded borehole
24 Bolt head
25 Shoulder
26 Flattened area
81 Clamping bolt
110 Clamping sleeve
115 Bolt head
117 Collar
120 Nut

I claim:

1. A cone bolt-connection for a multi-disc shaft clutch, comprising:

a clamping bolt having a bolt head at one end;

a first clamping sleeve having a conical borehole for accepting said clamping bolt therethrough and having a first collar at one end, said first clamping sleeve positioned in a conically shaped seat such that said first collar forms an annular gap with said bolt head, said gap having a width proportional to a tightening measure of said bolt-connection; and a second clamping sleeve having a cylindrical borehole for radially clamping first and second disc packets and having a second collar at one end, said first clamping sleeve positioned in a cylindrically shaped seat such that said second collar, in conjunction with a clamping ring, positively fixes said first and second disc packets in an axial direction.

2. The cone bolt-connection according to claim 1, wherein said first clamping sleeve has exterior threading at the opposite end to accept a nut for axially clamping said first and second disc packets, wherein said clamping bolt and borehole being threaded, such that when said bolt is rotated in a tightening position, said first clamping sleeve expands radially.

3. The cone bolt-connection according to claim 2, wherein said nut comprises an abutment to support a bolt head of said bolt.

4. The cone bolt-connection according to claim 1, further comprising a nut for selectively axially clamping said first and second disc packets, said nut having diametrically opposed external channels.

5. The cone bolt-connection according to claim 1, wherein said bolt head comprises two external substantially flat portions.

* * * * *